US006862559B1

(12) United States Patent
Hogg (10) Patent No.: US 6,862,559 B1
(45) Date of Patent: Mar. 1, 2005

(54) METHODS AND APPARATUSES FOR MEASURING DIVERSITY IN COMBINATORIAL STRUCTURES

(75) Inventor: Tad Hogg, Mountain View, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/359,599

(22) Filed: Jul. 23, 1999

(51) Int. Cl.[7] .................................................. G06F 17/10
(52) U.S. Cl. ...................... 703/2; 707/7; 707/2; 707/3; 707/4; 707/5; 707/6; 707/102; 706/45; 706/55
(58) Field of Search ............................ 703/2, 3; 707/7, 707/3, 6, 203; 715/511, 513, 500, 508

(56) References Cited

U.S. PATENT DOCUMENTS

| | | | | |
|---|---|---|---|---|
| 5,703,792 A | * | 12/1997 | Chapman | ...................... 702/27 |
| 5,727,051 A | * | 3/1998 | Holender | ............... 379/112.05 |
| 5,764,740 A | * | 6/1998 | Holender | ............... 379/112.05 |
| 5,872,918 A | * | 2/1999 | Malomsoky et al. | ....... 709/220 |
| 5,895,470 A | * | 4/1999 | Pirolli et al. | ................ 707/102 |

(List continued on next page.)

OTHER PUBLICATIONS

"A Library for Visualizing Combinatorial Structures", M. Najork, pp. 164–171, IEEE 1070–2385/94, IEEE 1994.*
"The Combinatorial Structure of Fuzzy Functional Dependencies", A. C. Sali, pp. 239–243, IEEE 0–7803–3627–5/97, IEEE May 1997.*
"A Combinatorial, Strongly Polynomial-time Algorithm for Minimizing Submodular Functions", S. Iwata, STOC 2000, ACM 1–58133–184–4/00/5, 1999.*
"Extracting Randomness: How and Why A Survey", N. Nisan, IEEE 0–8186–7386–9/96, IEEE 1996.*
"On the Average Delay for Routing Subject to Independent Deflections", B. Hajek, IEEE Trans. on Info. Theory, vol. 39, No. 1, Jan. 1993.*

(List continued on next page.)

Primary Examiner—Jean R. Homere
Assistant Examiner—Fred Ferris
(74) Attorney, Agent, or Firm—Fliesler Meyer LLP (57) ABSTRACT

A method for computing a diversity measure H(m) for combinatorial structures involves identifying all M possible substructures having m elements from among the n elements of the combinatorial structure. The number of the substructures that are similar to each such substructure is determined, and the frequency of each distinct substructure is calculated using the number of similar substructures and the total number of substructures M. The method uses the frequency of each distinct substructure to compute an entropy corresponding to m. By the same process described above, and entropy corresponding to m+1 is computed. The entropy corresponding to m+1 is subtracted from the entropy corresponding to m to produce the diversity measure H(m). In the preferred embodiment, similar substructures are determined by being identical or isomorphic. In an alternative embodiment, a distance function is used to compute a distance between two substructures, and only if the distance is less than a predetermined threshold are the two substructures determined to be similar. In the preferred embodiment, the entropy is computed by summing the frequency of each distinct substructure multiplied by the logarithm of the frequency of each distinct substructure. In an alternative embodiment, the entropy is computed by summing the frequency of each distinct substructure by the logarithm of the quotient of the frequency divided by an expected frequency of the distinct substructure. Generalized graphs such as can be used to model the Web are combinatorial structures suitable for use with the methods according to the present invention.

24 Claims, 9 Drawing Sheets

U.S. PATENT DOCUMENTS

| | | | | |
|---|---|---|---|---|
| 5,966,140 | A | * | 10/1999 | Popovic et al. ............. 345/441 |
| 6,044,366 | A | * | 3/2000 | Graffe et al. .................. 707/2 |
| 6,198,412 | B1 | * | 3/2001 | Goyal ......................... 341/50 |
| 6,285,995 | B1 | * | 9/2001 | Abdel-Mottaleb et al. ..... 707/3 |
| 6,304,639 | B1 | * | 10/2001 | Malomsoky et al. .. 379/112.04 |
| 6,334,125 | B1 | * | 12/2001 | Johnson et al. ................ 707/3 |
| 6,397,205 | B1 | * | 5/2002 | Juola ............................. 707/2 |
| 6,539,376 | B1 | * | 3/2003 | Sundaresan et al. ........... 707/5 |
| 6,564,197 | B2 | * | 5/2003 | Sahami et al. ................ 706/55 |
| 6,654,743 | B1 | * | 11/2003 | Hogg et al. ..................... 707/7 |
| 2003/0014379 | A1 | * | 1/2003 | Saias et al. ................... 706/45 |

OTHER PUBLICATIONS

"Voronoi Diagrams—A Survay of a Fundamental Geometric Data Strucutre", F. Aurenhammer, ACM Computing Surveys, vol. 23, No. 3, Sep. 1991.*

"SONIA: A Service for Organizing Networked Information Autonomously", M. Sahami, ACM 0–89791–965–3/98/6, ACM 1998.*

"Analysis and Design of Server Informative WWW–sites" A. M. Zarkesh, CIKM 97', ACM 0–89791–970, ACM 1997.*

"Robust self–assembly using highly designable structures", T. Hogg, Nanotechnology 10, IOP Publishing, Jan. 1999.*

"Better Than The Best: The Power of Cooperation", T. Hogg, 1992 Lectures in Complex Systems, pp. 165–184, Addison–Wesle 1993.*

G. Chaitin, "Randomness and Mathematical proof", *Scientific American,* 232:47–52, May 1975.

S. Pincus, B. H. Singer, "Randomness and degrees of irregularity", *Proc. Natl. Acad. Sci. USA,* 93:2083–2088, 1996.

T. Hogg, B.A. Huberman, C. Williams "Phase Transitions and the Search Problem", *Artificial Intelligence,* 81:1–15, 1996.

B.A. Huberman, T. Hogg, "Complexity and Adaptation", *Physica,* 22D:376–384, 1986.

B.A. Huberman, T. Hogg, "Communities of Practice: Performance and Evoluation", *Computational and Mathematical Organization Theory,* 1(1):73–92, 1995.

H. Kautz, B. Selman, S., M. Shah, "The Hidden Web", *AI Magazine,* 18(2):27–36, Summer 1997.

R.M. May, "Will a Large Complex System be Stable?", *Nature,* 238:413–414, Aug. 1972.

S. Pincus, R.E. Kalman, "Not All (Possibly) 'Random' Sequences are Created Equal", *Proc. Natl. Acad. Sci. USA,* 94:3513–3518, 1996.

G. Salton, J. Allan, C. Buckley, A. Singhal, Automatic Analysis, Theme Generation, and Summarization of Machine–Readable Texts, *Science,* 264:1421–1426, Jun. 1994.

* cited by examiner

| i | Substructure $C_i$ | Monotomically Renumbered Substructure | Distinct Similarity Group | Similarity Count $n_i$ |
|---|---|---|---|---|
| 1 | 1 - 2 - 3 | 1 - 2 - 3 | A | 2 |
| 2 | 2 - 1 - 4 | 2 - 1 - 3 | B | 1 |
| 3 | 1 - 4 - 3 | 1 - 3 - 2 | C | 1 |
| 3 | 2 - 3 - 4 | 1 - 2 - 3 | A | 2 |

METHODS AND APPARATUSES FOR MEASURING DIVERSITY IN COMBINATORIAL STRUCTURES

BACKGROUND OF THE INVENTION

1. Field of the Invention

The present invention pertains to the field of automated analysis of combinatorial structures. Specifically, the present invention involves automated measurement of diversity of combinatorial structures such as graphs, as can be used to model the Web.

2. Discussion of the Related Art

The World Wide Web can be viewed as an ecology with a rich and rapidly evolving set of relationships among its components. The variety, or diversity, of structures is an important aspect of ecological systems. Diversity is related to the range of capabilities, the adaptability and the overall complexity of the ecology. While appealing in concept, diversity is difficult to quantify and measure for combinatorial structures such as the Web, particularly without resorting to asymptotic limits that apply only to very large systems.

The World Wide Web consists of a rapidly growing and changing collection of pages. The relationships among these pages, including explicit hyperlinks, textual similarity, patterns of usage and overlapping authorship, form a rich, evolving structure.

These relationships are most directly useful for finding items relevant for some question, either by manually following links or through automated searches. However, the relationships can also be viewed from an ecological perspective. The ecological perspective considers the resulting large-scale structure and evolution of the Web, which results from the actions of many autonomous individuals with a variety of goals.

A variety of proposals for precise definitions of diversity, and the related concept of complexity, have been made for various types of structures. A formal and general definition is algorithmic complexity, the length of the shortest program that produces the structure. While algorithmic complexity has good formal properties, it applies only asymptotically to large structures, thus is unacceptable for small structures, and is not computable for individual structures. Another prior approach, described by B. A. Huberman and T. Hogg, "Complexity and Adaptation," *Physica*, 22D:376–384, 1986, defined diversity in terms of the number of distinct component parts, which is readily computed. However, as defined, it applies only to trees, not the more general combinatorial structures needed to describe the Web. Approximate entropy is also easily computed and readily related to information theory measures asymptotically; but useful even for small sequences. However, it applies only to sequences, a very limited type of structure.

As is apparent from the above discussion, a need exists for a effective and easily computable measure of diversity for general combinatorial structures of any arbitrary size, such as graphs which can be used to model Web pages or groups of Web pages.

SUMMARY OF THE INVENTION

Some conventional measures for diversity of combinatorial structures apply only asymptotically to large structures and not directly computable for a given arbitrary structure. Other conventional measures for diversity, while computable and useful for small structures, do not apply to general combinatorial structures. An object of the present invention is to develop a computable measure of diversity for useful for general combinatorial structures of any size, such as graphs which can be used to model Web pages or groups of Web pages.

According to the present invention, a method for computing a diversity measure $H(m)$ for a combinatorial structure involves identifying all M possible substructures having m elements from among the n elements of the combinatorial structure C. Thus, M is the number of unique subsets of m elements from n elements, where $m<n$, and is equal to $n!/[(n-m)!m!]$. The number of the substructures that are similar to each such substructure is determined, and the frequency of each distinct substructure is calculated using the number of similar substructures and the total number of substructures M. The method uses the frequency of each distinct substructure to compute an entropy corresponding to m. By the same process described above, and entropy corresponding to m+1 is computed. The entropy corresponding to m+1 is subtracted from the entropy corresponding to m to produce the diversity measure $H(m)$. $H(m)$ is related to the expected probability that components of size m+1 are similar given that those of size m are similar.

In the preferred embodiment, similar substructures are determined by being identical or isomorphic after a monotonic renumbering of the substructure elements is performed. In an alternative embodiment, a distance function is used to compute a distance between two substructures, and only if the distance is less than a predetermined threshold are the two substructures determined to be similar. This is particularly useful for graphs having weights associated with nodes and/or links. In another embodiment, similar substructures are determined by being identical after a monotonic renumbering of the substructure elements is performed.

In the preferred embodiment, the entropy is computed by summing the frequency of each distinct substructure multiplied by the logarithm of the frequency of each distinct substructure. In an alternative embodiment, the entropy is computed by summing the frequency of each distinct substructure by the logarithm of the quotient of the frequency divided by an expected frequency of the distinct substructure. The expected frequency of each distinct substructure either is determined empirically from observed data, is estimated, or is extracted from a theoretical model. In one embodiment, frequency times log frequency is summed for all distinct substructures; in another embodiment, log frequency is summed for all substructures, whether distinct or not, and the resulting sum is divided by the total number of substructures. Both embodiments yield the same result, because in the latter case each member of a distinct similarity group is included in the summation, whereas in the former case only one member of a distinct similarity group is included in the summation.

In order to ensure the possibility of a reasonable number of instances of each subgraph, m must be quite small, for example less than $O(\ln \ln n)$. Random structures are somewhat less diverse than the maximum possible diversity measure. At the other extreme, highly-ordered structures have low values of H. Thus, the diversity measure according to the present invention is able to distinguish diverse structures from ordered or random ones, a useful criterion for identifying complex structures.

Generalized graphs such as can be used to model the Web are combinatorial structures suitable for use with the methods according to the present invention. These and other features and advantages of the present invention are fully described in the Detailed Description of the Invention and illustrated in the Figures.

BRIEF DESCRIPTION OF THE DRAWINGS

The Figures are more fully described in the Detailed Description of the Invention.

DETAILED DESCRIPTION OF THE INVENTION

From a practical viewpoint, identifying diverse parts of the Web is useful for finding starting points for searches or finding a variety of viewpoints on a topic. As agent-based Web services develop, maintaining diversity is applicable to help ensure a full range of possible services are considered.

However, a recently introduced concept of approximate entropy is generalized according to the present invention to application to combinatorial structures such as the Web by examining the components of the structure, thereby extending a previously developed diversity measure for trees. See, B. A. Huberman and T. Hogg, Complexity and Adaptation, *Physica*, 22D:376–384, 1986. The measure of diversity according to the present invention particularly well-suited to relatively small sets of items and is simple to compute.

Diversity is one important aspect of ecosystems, including biological ecosystems and social systems (such as the legal and scientific communities) as well as the Web. By maintaining a variety of structures and approaches to addressing various problems, diverse systems as a whole are robust, or adaptable, in the face of continual changes. Maintaining diversity is also an issue in computational methods based on this analogy, for example, genetic algorithms. Diversity will also be important for agent-based systems that make use of the Web, for example, for electronic commerce, to make sure a wide variety of options are considered in searching for the best possible transactions.

While simple in concept, automated use of diversity requires a simple quantitative measure. Ideally, a good measure of diversity will:

1. focus on those aspects of an ecology relevant to desired applications;
2. be easily computable;
3. allow quantitative comparison among different structures;
4. apply directly to given, finite-size structures (therefore, not just asymptotically large sizes);
5. distinguish diverse structures from simple ordered or random ones; and
6. apply to the structure itself, independent of the process whereby it was created.

A new, and broadly applicable, diversity measure according to the present invention is obtained by extending the notion of approximate entropy to general combinatorial structures by examining the component parts of the structure. This generalization combines the idea of examining component parts (extended to any combinatorial structure, not just trees) with the use of entropy-like functions to obtain a quantitative value with well-known theoretical properties.

For a given combinatorial structure, such as a graph, the general method of computing the new measure according to the present invention is to first identify all the substructures of a given small size, and then count the average number of these substructures that are similar to each other according to a specified distance measure between the substructures. Because there are a variety of ways to define substructures of combinatorial structures and measure their similarity, this general method for defining diversity can be instantiated in many ways. The particular choices depend on the aspects of the structure that are important for a given application.

Figure 1:
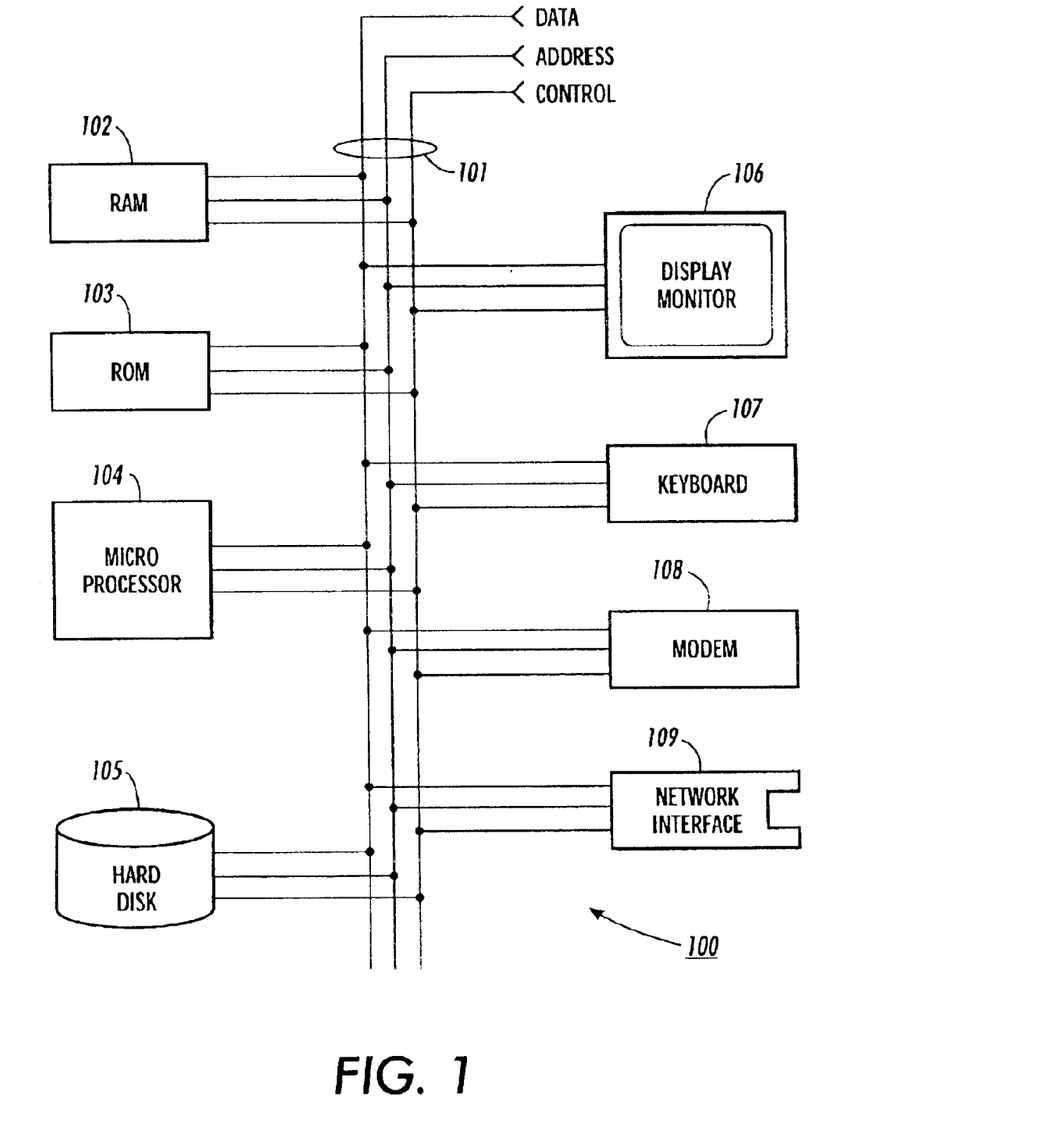
FIG. 1 illustrates a general purpose computer architecture suitable for implementing the methods according to the present invention.

FIG. 1 illustrates a general purpose computer system 100 suitable for implementing the methods according to the present invention. The general purpose computer system 100 includes at least a microprocessor 104. The general purpose computer may also include random access memory 102, ROM memory 103, a keyboard 107, and a modem 108. All of the elements of the general purpose computer 100 are optionally tied together by a common bus 101 for transporting data between the various elements. The bus 101 typically includes data, address, and control signals. Although the general purpose computer 100 illustrated in FIG. 1 includes a single data bus 101 which ties together all of the elements of the general purpose computer 100, there is no requirement that there be a single communication bus 101 which connects the various elements of the general purpose computer 100. For example, the microprocessor 104, RAM 102, and ROM 103, are alternatively tied together with a data bus while the hard disk 105, modem 108, keyboard 107, display monitor 106, and network interface 109 are connected together with a second data bus (not shown). In this case, the first data bus 101 and the second data bus (not shown) are linked by a bidirectional bus interface (not shown). Alternatively, some of the elements, such as the microprocessor 102 and RAM 102 are connected to both the first data bus 101 and the second data bus (not shown), and communication between the first and second data bus occurs through the microprocessor 102 and RAM 102. The network interface 109 provides optional communication capability to a local area network LAN using an ethernet connection, for example. The modem 108 allows the computer 100 to communicate optionally through the telephone system. The methods of the present invention are executable on any general purpose computer system such as the 100 illustrated in FIG. 1, but there is clearly no limitation that this computer system is the only one which can execute the methods of the present invention.

Figure 2:
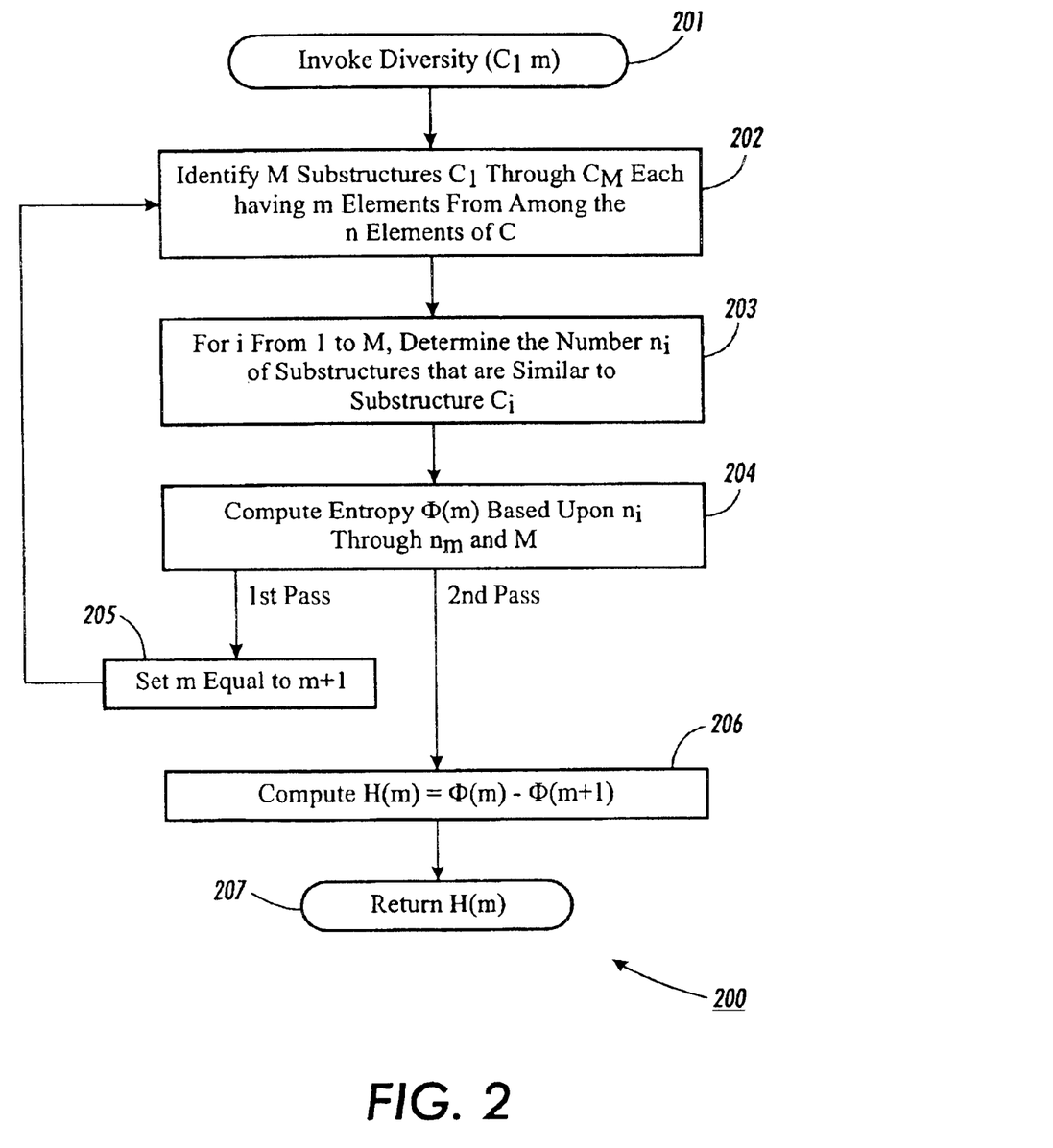
FIG. 2 is a flow chart illustrating a method for computing a diversity measure according to the present invention.

FIG. 2 is a flow chart illustrating a method 200 for computing a diversity measure H(m) according to the present invention. The diversity function is invoked at step 201. At step 202, the method identifies the M substructures $c_1$ through $c_M$ each having m elements from among the n elements of C. In other words, all possible combinations of m elements are selected from the n elements of C. Thus, M is n!/[(n−m)!m!]. In the case of a graph, the elements are the nodes of the graph, and a link between any particular nodes a and b of the substructures $c_i$ containing nodes a and b exists only if nodes a and b have a link between them in the graph C. Thus, each of the M substructures c, through CM have a different set of nodes, and the links between the nodes of the substructures (subgraphs) are determined by the connectivity pattern in the original graph C. At step 203, for each one of the substructures $c_1$ through $c_M$, a corresponding number (one of $n_1$ through no is computed by counting substructures from among the M substructures that are similar to the one of the substructures for which the number is being computed. Because each substructure is at least similar to itself, each one of $n_1$ through nM is at least one. Similarity or non-similarity between two substructures is alternatively determined by any one of variety of manners according to the present invention, as is described below.

At step 204, the entropy Φ(m) is computed based upon the numbers $n_1$ through $n_M$ and M itself. If this is the first execution of step 204 since the invocation of the diversity measure method according to the present invention, then step 205 increments m to m+1. The computation of a second entropy Φ(m+1) is then computed by repeating steps 202 through 204, with m+1 substituted for m. After the second execution of step 204, step 206 computes difference between Φ(m) and Φ(m+1) by subtracting Φ(m+1) from Φ(m). The resulting H(m) is the diversity measure according to the preferred embodiment of the present invention. However, it is to be noted that entropy Φ(m) as applied to combinatorial structures is itself a novel measure according to the present invention regardless of whether or not entropy Φ(m+1) is computed and compared with Φ(m). The method 200 concludes at step 207 with the diversity measure H(m) being returned as the result of the method.

Figure 3:
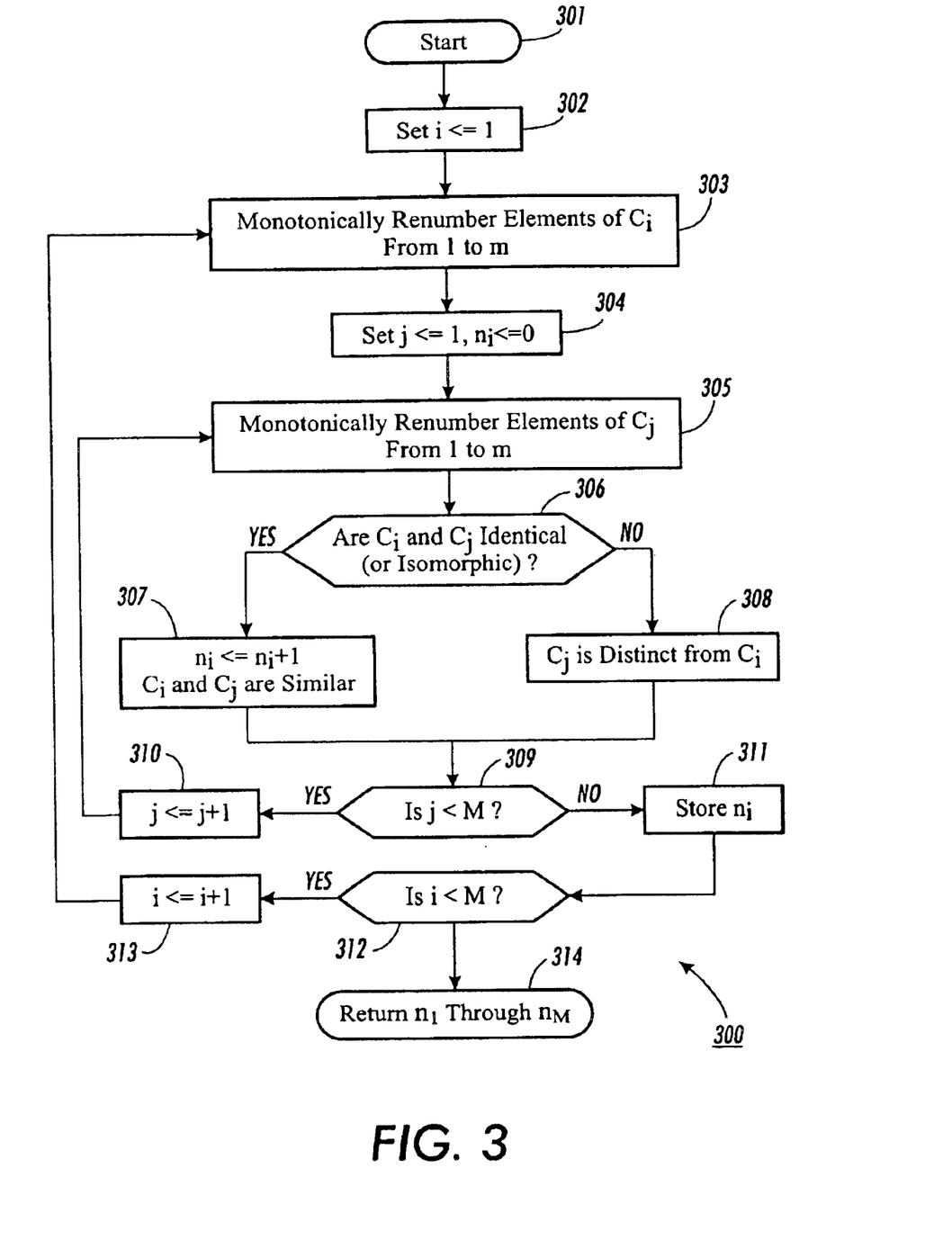
FIG. 3 is a flow chart illustrating a method for performing the step of computing the numbers n, through nM of substructures which are identical or isomorphic to each other in the methods of the present invention.

FIG. 3 is a flow chart illustrating a method 300 for performing the step of computing the numbers $n_1$ through $n_M$ of substructures which are identical or isomorphic to each other in the methods of the present invention. Thus, the method 300 is a specific implementation of the step 203 illustrated in FIG. 2. The method starts at step 301, and the substructure counter number i is initialized to 1 at step 302. At step 303, the m elements of $i^{th}$ substructure $c_i$ are monotonically renumbered from 1 to m, as will be described below in conjunction with FIG. 6. At step 304, substructure counter number j is initialized to 1, and the count number $n_i$ of similar substructures is initialized to 0. At step 305, the m elements of jth substructure $c_j$ are monotonically renumbered from 1 to m. At step 306, the monotonically renumbered substructures $c_i$ and $c_j$ are compared according to some similarity criterion. For example, strict graph identity is one criterion for determining similarity. This criterion is preferably made less restrictive by adding graph isomorphism as an acceptable form of similarity. Thus, two graphs are isomorphic if the nodes can be renumbered in any arbitrary way to produce identical graphs.

If the two substructures are similar, then step 307 increments the similarity count number $n_i$ by one. If the two substructures are not similar, then step 308 does not increment the similarity count number $n_i$ as $c_j$ and $c_i$ are distinct from each other and thus must be classified in different distinct similarity groups as will be described below with regard to FIG. 6. In either case, step 309 determines if the last substructure $C_M$ has been compared to substructure $c_i$. If the last substructure $C_M$ has not been compared to $c_i$, then step 310 increments the substructure counter j and returns the method to step 305. If the last substructure $C_M$ has been compared to $c_i$, then the similarity count number $n_i$ is stored somewhere such as in the table 600 illustrated in FIG. 6. Step 312 determines if a similarity count number $n_M$ has been computed for the last substructure $c_M$. If the similarity count number $n_M$ has been computed, the method is complete at step 314 with the return of the similarity count numbers $n_i$ through $n_M$. If the similarity count number nM has not been computed, then the step 313 increments the substructure counter i by one and returns the method to step 303.

Figure 6:
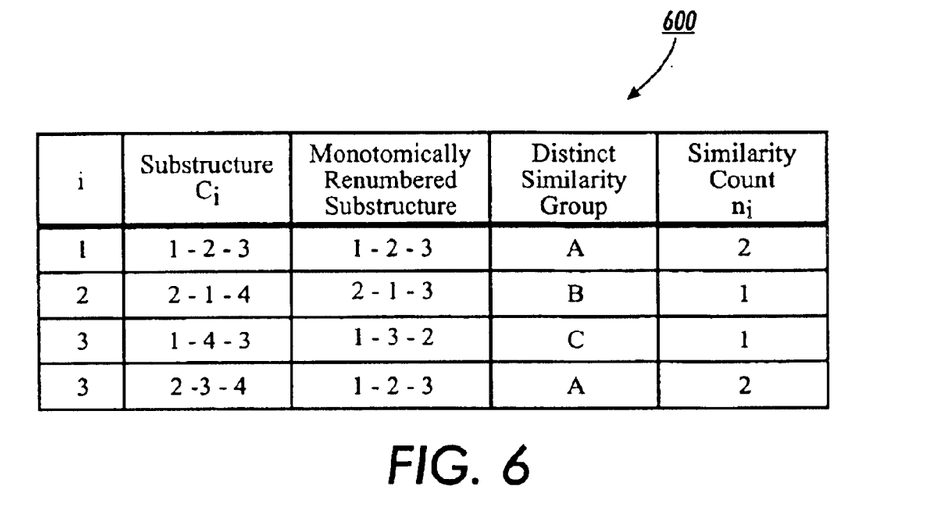
FIG. 6 is a table illustrating the four subgraphs, their monotonically renumbered equivalents, the distinct similarity group to which each subgraph belongs, and the similarity count for each subgraph.

It is to be understood that the method 300, as illustrated in FIG. 3, is logically how the similarity count numbers $n_i$ through $n_M$ are computed; however, various shortcuts and optimizations of the computation are anticipated and included in the preferred embodiment of the present invention. For example, a table 600 such as illustrated in FIG. 6 is preferably developed as method 300 is being performed, thereby enabling quick retrieval of results which would otherwise be repeatedly computed. For example, the first time step 303 or 305 is performed on any specific substructure $c_i$ through $c_M$, the monotonically renumbered substructure is preferably stored in a table such as illustrated in FIG. 6. When subsequent executions of steps 303 and 305 are performed on the same substructure, the result is merely looked up in the table 600 rather than being recomputed each time. In this manner, each substructure $c_1$ through CM is monotonically renumbered only one time. Other preferred optimizations are discussed below.

As a specific useful example, for any graph C with n nodes, the $(^n_m)$=n!/[(n−m)!m!]=M subgraphs with m nodes are the substructures identified by the method of the present invention. All possible combinations of m nodes are identified, and the resulting substructures are the m nodes as connected in the same manner as in the graph C.

The similarity measure between these subgraphs can be chosen to be subgraph identity, subgraph isomorphism, or a more relaxed similarity measure. In the case that subgraph identity is chosen as the similarity measure, each of the subgraphs is identical to only one of the $2^{(^n_m)}$ different graphs with m nodes. (The symbol "^" is used herein to represent exponentiation.) Let $n_i$ be the number of subgraphs identical to the $i^{th}$ m-node graph and $f_i=n_i/(^n_m)$ their relative frequency, for i=0, . . . , $2^{(^n_m)}$−1. The entropy of this set of frequencies is as follows in Equation 1.

$$\Phi(m) = \sum_i f_i \ln f_i \qquad (1)$$

Finally, the behavior of the structure with respect to components of size m+1 is H(m)=Φ(m)−Φ(m+1). This definition according to the present invention generalizes the measure of approximate entropy from sequences to any combinatorial structure. It is related to the expected probability that components of size m+1 are similar given that those of size m are similar.

More generally, for an arbitrary combinatorial structure C of size n, the substructures $c_1, c_2, \ldots c_M$ of size m are identified by the method according to the present invention. Among these substructures, the method then evaluates the frequency with which each distinct substructure occurs to obtain the relative frequencies $f_i$. These relative frequencies are then used in Eq. 1 to evaluate the diversity value for the structure C. Thus, the measure according to the present invention applies to any structure for which substructures of a given size are identifiable.

Figure 4:
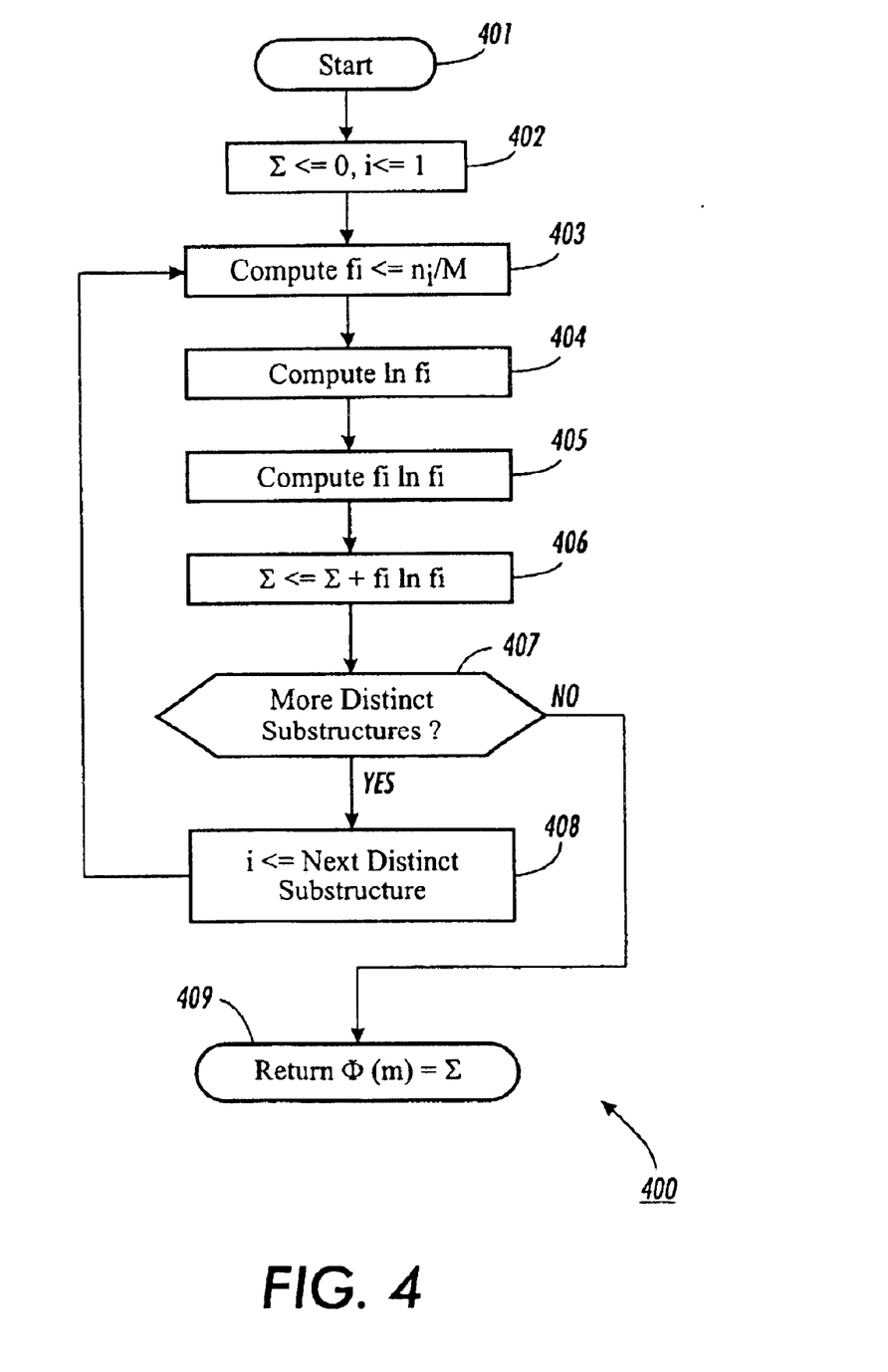
FIG. 4 is a flow chart illustrating a method for performing the step of computing the entropy based upon n, through nM and M in the methods of the present invention.

FIG. 4 is a flow chart illustrating a method 400 for performing the step of computing the entropy based upon $n_1$ through $n_M$ and M in the methods of the present invention. Thus, the method 400 illustrates how step 204 illustrated in FIG. 2 is performed. The method starts at step 401. At step 402, the sum $\Sigma$ is initialized to zero, and the similarity counter i is initialized to one. At step 403, the frequency $f_i$ is computed by dividing $n_i$ by M. At step 404, a logarithm of frequency $f_i$ is computed. At step 405, $f_i \ln f_i$ is computed by multiplying the results of steps 403 and 404. At step 406, the sum $\Sigma$ is accumulated by adding the result of step 406 to the current value of sum $\Sigma$. Step 407 determines if all distinct substructures have been considered. If all distinct substructures have been considered, the method 400 returns the current value of the sum $\Sigma$ as the entropy $\Phi(m)$ at step 409. If step 407 determines that all distinct substructures have not been considered, then step 408 increments i to the next distinct substructure and returns the method to step 403.

It is to be noted that the substructure counter i is not incremented by one in step 408 but rather is increased by a value which advances i to the next distinct substructure. For example, if substructures $c_1$ and $c_2$ are similar, then they are deemed to belong to the same distinct similarity group. In table 600 in FIG. 6, $c_1$ and $c_4$ belong to the same distinct similarity group labeled "A". Thus, only one of $c_1$ and $c_4$, namely the first one $c_1$, is taken into consideration in the computation 400 shown in FIG. 4 and described by Equation 1. All members of the same distinct similarity group necessarily will have the same similarity count $n_i$. This is because if $c_i$ is similar to $c_j$ then $c_j$ is similar to $c_i$, assuming that the same similarity definition is used. Thus, $n_1$ and $n_4$ in table 600 shown in FIG. 6 are have equal values of 2.

The sum of the frequencies of all distinct substructures is 1, thus the multiplication in step 405 of the logarithm of $f_i$ by the frequency $f_i$ properly weights each logarithm. However, the sum of all the frequencies $f_1$ through fM for all (L) possible substructures (including non-distinct substructures) is greater than 1 if any substructures are similar.

Using the method 400 and a table such as shown in FIG. 6, it is possible to reduce the number of table entries (rows) to the number of distinct substructures. For example, a new row is added each time a new distinct similarity group is detected. In this optimized case, each time a substructure $c_i$ is determined to be similar to another substructure $c_j$ in step 306, then step 307 marks the substructure $c_j$ as having been fully considered in the computation. In this optimized case, step 303 marks substructure $c_i$ as having been fully considered in the computation. In this modified method 300, step 310 and 313 are replaced with steps which advance the respective substructure counters to the next value which has not been marked as considered in the computation. Similarly in this case, step 304 is modified to initialize j to the first value which has not been marked as considered in the computation. Also in this case, test 309 is replaced with a test to determine if all unmarked substructures have been used as $c_j$, and test 312 is replaced with a test to determine if all substructures have been marked and thus categorized into a distinct similarity group. In this modified method, step 306 is performed between M−1 and M(M−1)/2 times, inclusive, depending upon how many distinct similarity groups actually exist among the substructures $c_i$ through $c_M$. In this modified method, if only one distinct similarity group exists, then all substructures are similar, and step 306 is performed only M−1 times, resulting in only one table entry having a similarity count $n_i$=M. If all substructures are distinct, then M distinct similarity groups exist, and step 306 is performed M(M−1)/2 times, resulting in M separate table entries each having a similarity count of 1. In any case, it is clear from the above modified example that many tradeoffs between computation and storage can be applied to correctly compute the necessary similarity counts for each distinct similarity group. Thus, the example shown in FIG. 3, in which step 306 is performed $M^2$ times, is offered to illustrate in a logically simple way, but not computationally efficient or optimal way, to compute the necessary similarity counts for each distinct similarity group. All such alternative ways for computing the necessary similarity counts and distinct similarity groups using various forms of method 300 and table 600 are deemed to lie within the spirit and scope of the present invention.

Large values of H, for a range of m values, correspond to diverse structures, with good representation of the full range of possible substructures. To provide a discriminating measure, m must not be too large. As an extreme, if m=n then every graph would only have a single component (namely the entire graph) resulting in the same frequency distribution for every possible graph. In fact, to ensure the possibility of a reasonable number of instances of each subgraph, m must be quite small, for example less than O(ln ln n).

One interesting property of this entropy-based measure is that the most diverse cases are relatively rare. Typical, or "random" structures are somewhat less diverse than the maximum possible diversity measure, as was also observed for diversity measures applied to tees. At the other extreme, highly ordered structures have low values of H. Thus the diversity measure according to the present invention is able to distinguish diverse structures from ordered or random ones, a useful criterion for identifying complex structures.

Another aspect of this measure is that different representations of the same combinatorial structure can give different values for H, especially for small cases. This property emphasizes the importance of selecting the component parts and similarity metric appropriate for a given application. This observation contrasts with the behavior of algorithmic complexity, which is independent of representation (for asymptotically large structures).

Figure 5:
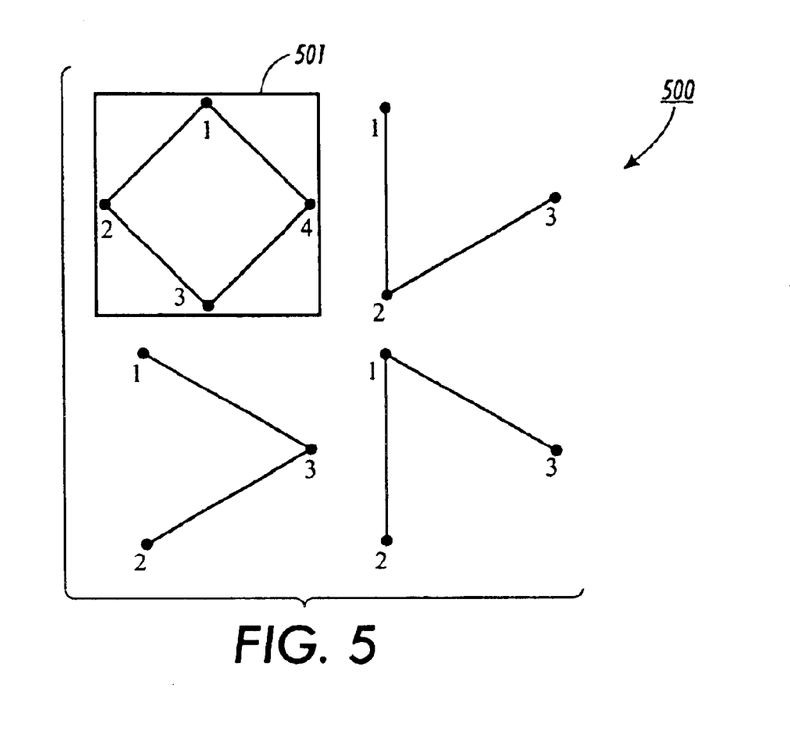
FIG. 5 illustrates a graph having four nodes and the its three distinct monotonically renumbered subgraphs having three nodes.

FIG. 5 illustrates a graph having four nodes and the its three distinct monotonically renumbered subgraphs having three nodes. As an example, consider a 4-node graph, which has (43)=4 possible 3-node subgraphs consisting of the following sets of nodes: {1,2,3}, {1,2,4}, {1,3,4}, and {2,3,4}. For the particular graph shown in FIG. 5, in the first and last of these sets, the second node of the subgraph has two edges. The subgraph consisting of {1,2,4} has the 1st node with two edges, and the subgraph of {1,3,4} has the 3rd node with two edges. These distinct subgraphs, are shown clockwise in the Figure from the upper right. Thus, the counts for these three subgraphs are 2, 1 and 1, giving $f_1$=½, and $f_2$=$f_3$=¼. Thus $\Phi(3)=\Sigma f_i \ln f_i$=−1.04.

FIG. 6 is a table illustrating the four subgraphs, their monotonically renumbered equivalents, the distinct similarity group to which each subgraph belongs, and the similarity count for each subgraph. For substructures $c_1$ through $C_4$ of the graph 501 illustrated in FIG. 5, the substructure itself is listed in table 600. The results illustrated in table 6 pertain to a test for identity in step 306 of the method 300. The substructure shows the connectivity of the member nodes as well as the three member nodes of the substructure. Table 600 also shows the monotonically renumbered substructure corresponding to each substructure. Each monotonically renumbered substructure includes nodes which are numbered 1 through m regardless of which of the n nodes were actually members of the substructure. For example, because node 3 is not included in substructure $c_2$, node 4 is renumbered as node 3. Because node 2 is not included in substructure $C_3$, nodes 3 and 4 are renumbered as nodes 2 and 3, respectively. Because node 1 is not included in substructure $c_4$, nodes 2, 3, and 4 are renumbered as nodes 1, 2, and 3, respectively. Monotonic renumbering of substructure $c_1$ produces no change, because substructure $c_1$ included the first three elements of the structure. Because the monotonically renumbered substructures $c_1$ and $C_4$ are identical (1-2-3), they belong to the same distinct similarity group A, since graph identity is specified as the similarity measure in this example. If graph isomorphism were hypothetically also included as the similarity measure, all for substructures $c_1$ through $c_4$ would be in the same distinct similarity group A, because all four substructures consist of a chain of three nodes, and are thus isomorphic. A three-node chain and a three-node fully-connected graph (a triangle) are not isomorphic. Because the distinct similarity group A has 2 members, namely $c_1$ and $c_4$, the distinct similarity count numbers $n_1$ and $n_4$ are 2. The other two substructures c and $C_3$ are only similar to themselves, and hence their respective similarity count numbers $n_2$ and $n_3$ are each 1.

Figure 7:
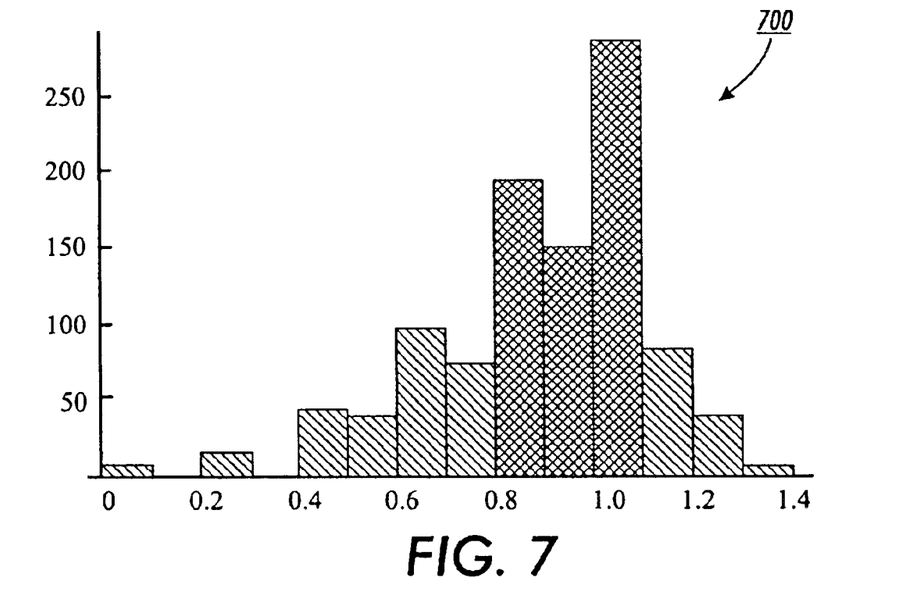
FIG. 7 illustrates a histogram of the number of graphs with 5 nodes as a function of the diversity measure H(2) according to the present invention.

FIG. 7 illustrates a histogram of the number of graphs with 5 nodes as a function of the diversity measure H(2) according to the present invention. There are $2^{(5_2)}=1024$ different 5 node graphs. The range of diversity measures is easily illustrated for small structures by explicitly enumerating all possible unique instances. For example, FIG. 7 shows the distribution of H(2) for all graphs with 5 nodes. This Figure illustrates how most of the graphs have moderately large values, but only a few graphs have the maximum possible value. This behavior continues with graphs of larger sizes.

Figure 8:
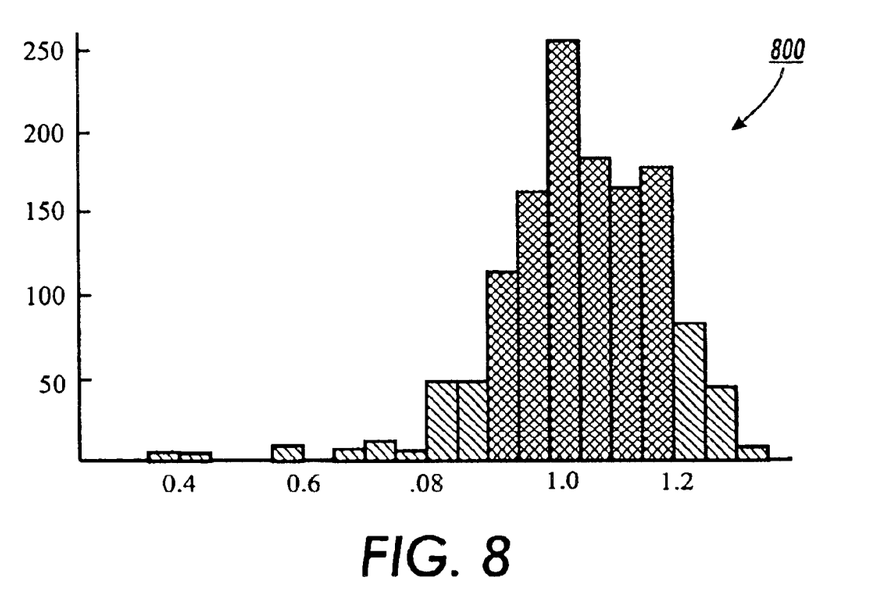
FIG. 8 illustrates a histogram of the number of trees with 6 nodes as a function of H(2) as computed according to methods of the present invention.

FIG. 8 illustrates a histogram of the number of trees with 6 nodes as a function of H(2) as computed according to methods of the present invention. There are $n^{(n-2)}$ possible n-node trees. Thus, there are 1296 possible 6-node trees. A tree is a graph where each node has at least one link to another node, and the graph contains no cycles. While graphs are an important combinatorial structure, the diversity measure can be applied to more restricted classes, such as trees as illustrated in FIG. 8. This behavior, of a few structures with higher diversity than typical cases, is analogous to that seen with trees using the previous measure of diversity described in B. A Huberman and T. Hogg, Complexity and adaptation, *Physica,* 22D:376–384, 1986. Thus the new measure can be applied to restricted classes of graphs (for example, trees) to identify diverse instances within those classes.

The diversity measure introduced above according to the present invention applies directly to discrete combinatorial structures. However, in some applications the structure has additional properties, such as weights associated with various links (for example, related to their frequency of use). Moreover, it may be useful to allow for errors or incorrectly placed links rather than requiring exact identity when matching substructures.

The diversity measure according to the present invention is also applicable to combinatorial structures with continuous-valued properties and errors by a less strict requirement for similarity among the substructures. Specifically, instead of counting the number of substructures that are identical to each other, the number of substructures that are within a certain threshold of similarity as determined by a distance function d(x,y) are counted. This use of a distance function can also be viewed as a coarse-graining of the structures during their comparison.

The extended definition proceeds as follows. For a combinatorial structure C of size n, we again identify the substructures $c_1, c_2, \ldots, c_M$ of size m, where M is the number of such substructures. For each substructure $c_i$, we determine $F_i$, the fraction of $c_1, c_2, \ldots, c_M$ whose distance from $c_i$ is less than a specified threshold δ, as described by Equation 2 below.

$$F_i = \frac{1}{M}\sum_j X_{ij} \quad (2)$$

In Equation 2 above, $X_{ij}=1$ if $d(c_i,c_j)<\delta$ and is 0 otherwise. With these values, Eq. 1 generalizes to Equation 3 below.

$$\Phi(m) = \frac{1}{M}\sum_i \ln F_i \quad (3)$$

Figure 9:
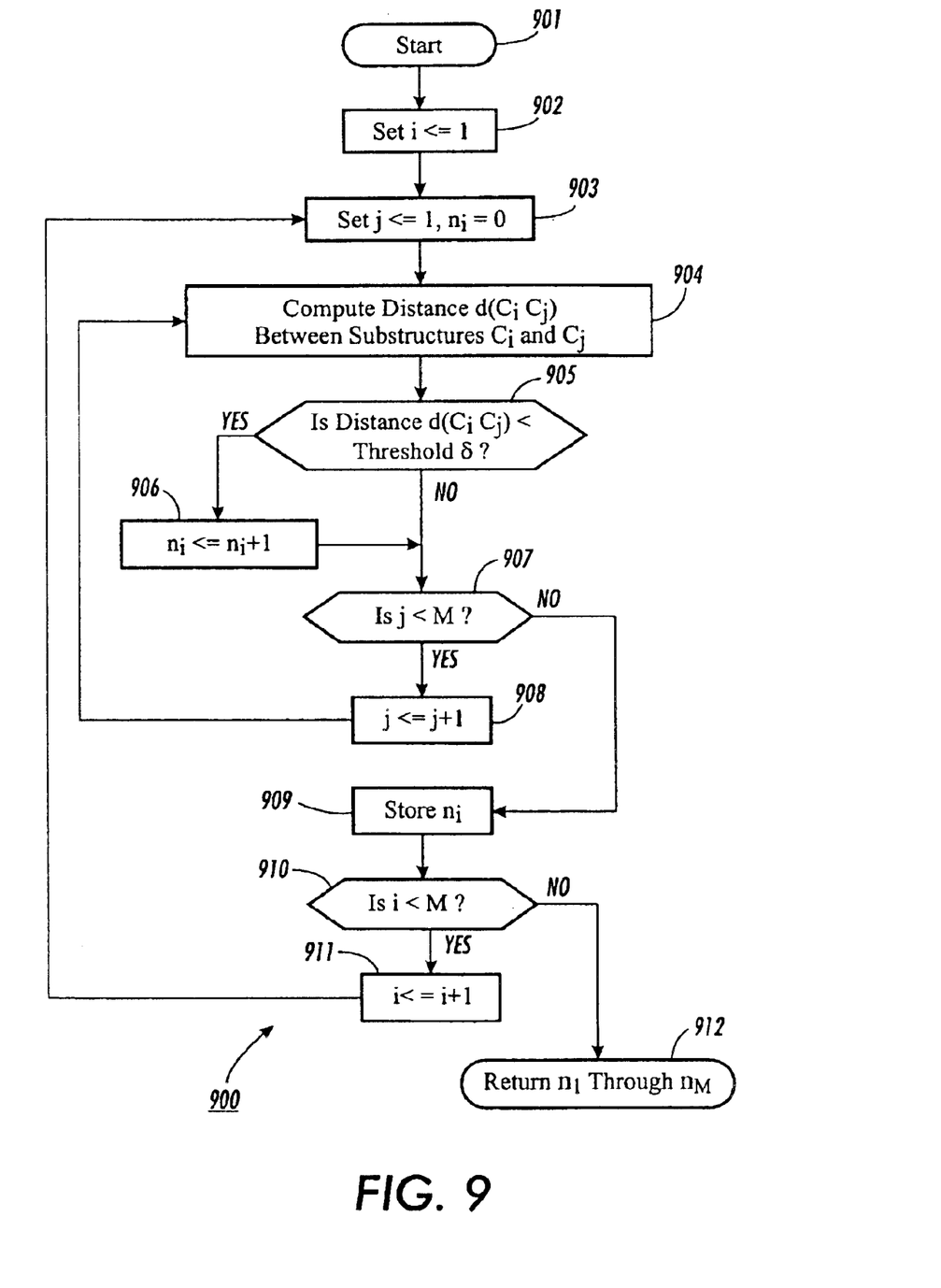
FIG. 9 illustrates another method for performing the step of computing the numbers $n_i$ through nM of substructures which are similar to each other in the methods of the present invention.

FIG. 9 illustrates another method 900 for performing the step of computing the numbers $n_i$ through $n_M$ of substructures which are similar to each other in the methods of the present invention. Method 900 illustrates an alternative way of performing step 203 illustrated in FIG. 2, in accordance with Equation 2 above. The method begins at step 901. At step 902, the substructure counter i is initialized to one. At step 903, the substructure counter j is initialized to one, and the similarity count number is initialized to zero. At step 904, a distance function $d(c_i,c_j)$ is computed to express the distance between $c_i$ and $c_j$ as a single scalar. This distance function is capable of taking into consideration many continuous or discrete attributes associated with the combinatorial structure, such as link or node weights. Alternatively, the distance function is capable of providing a similarity definition for graphs that is less restrictive than graph isomorphism, without requiring the graphs to have any additional link or node weights associated with them. At step 905, the distance computed in step 904 is compared to a threshold 8. If the distance is less than the threshold, then the similarity count $n_i$ is incremented by one at step 906, as the two substructures $c_i$ and $c_j$ are deemed similar. Step 907 determines if $c_i$ has been compared to all possible $c_j$. If not, then step 908 increments j and returns the method 900 to step 904. If so, then step 909 stores $n_i$ in the table 600 shown in FIG. 6. Test 910 determines whether $n_i$ has been computed for all substructures c, through CM. If more substructures remain, then step 911 increments the substructure counter i by one and returns the method to step 903. If no more substructures remain, then step 912 completes the method by returning the similarity counts $n_i$ through $n_M$.

Figure 10:
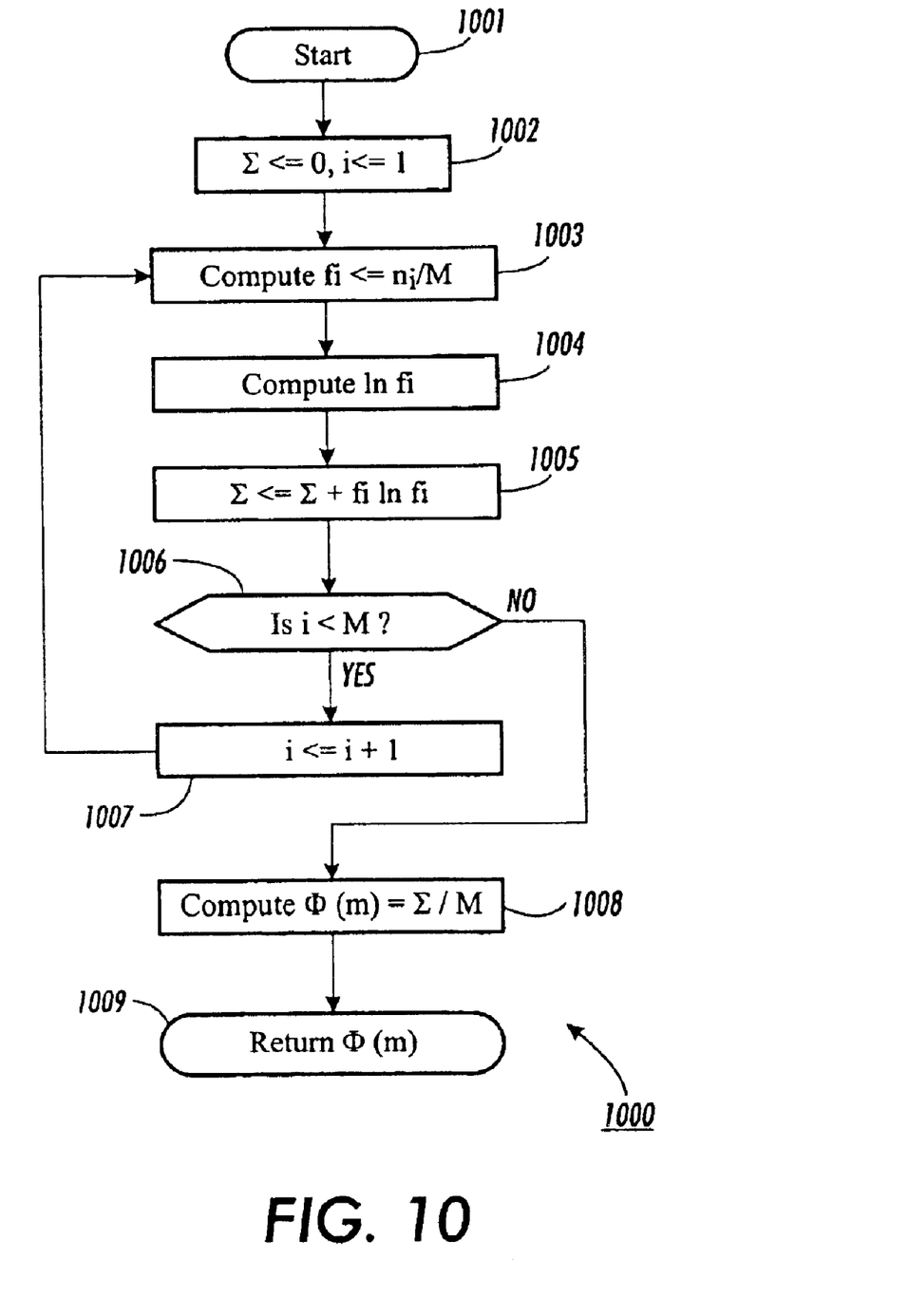
FIG. 10 is a flow chart illustrating another method for performing the step of computing the entropy based upon $n_i$ through $n_M$ and M in the methods of the present invention.

FIG. 10 is a flow chart illustrating another method for performing the step of computing the entropy based upon $n_1$ through $n_M$ and M in the methods of the present invention.

The method 1000 is an alternative and general way of implementing the step 204 shown in FIG. 2, and is described by Equation 3. The method 1000 begins at step 1001. At step 1002, the sum Σ is initialized to zero, and the substructure counter i is initialized to one. At step 1003, the fraction $F_i$ of all substructures that are similar to substructure $c_i$ (including $c_i$ itself) is computed by dividing the similarity count number $n_i$ by M. The logarithm of fraction $F_i$ is computed at step 1004. At step 1005, the sum Σ is accumulated by adding the logarithm of $F_i$ to the current value of the sum Σ. At step 1006, test 1006 determines if all M substructures have been processed, and if not, step 1007 increments the substructure counter i by one and returns the method to step 1003. After all M similarity count numbers $n_l$ through nM have been processed, step 1008 computes the entropy 4)(m) by dividing the sum Σ by M. The entropy Φ(m) is then returned at step 1009. In contrast to method 400 described above and by Equation 1 and method 1100 described below and by Equation 4, method 1000 sums the logarithms of F for all i from 1 to M, regardless of the memberships of the various substructures in any distinct similarity group. Thus, all members of every distinct similarity group are included in the computation, and therefore step 1005 is always performed M times. However, because Equation 3 and method 1000 sum log frequency (rather than frequency times log frequency as in Equation 1 and method 400), the inclusion of non-distinct substructures in the computation is exactly compensated by the final division by M in step 1008. Thus, method 1000 yields the same result as method 400, but requires more trips through the summation step and does not require any reference to the distinct similarity group categorizations of any of the substructures in steps 1006 and 1007.

Another type of application for diversity measures is to compare two sets of structures, or compare some observed structures to a theoretical model. For example, such a comparison helps determine if the model adequately captures the relationships in the observed structures. One way to perform this comparison is use the diversity measures directly. Another, more sensitive, method according to the present invention relies on the relative entropy of the different cases. That is, Equation 1 is replaced with the following Equation 4.

$$\Phi(m) = \sum_i f_i \ln \frac{f_i}{p_i} \quad (4)$$

In Equation 4 above, $p_i$ is the expected frequency of substructure $c_i$ based on the theoretical model (or empirically observed in the second set of structures). This function is zero when $f_i = p_i$ and is otherwise positive.

Figure 11:
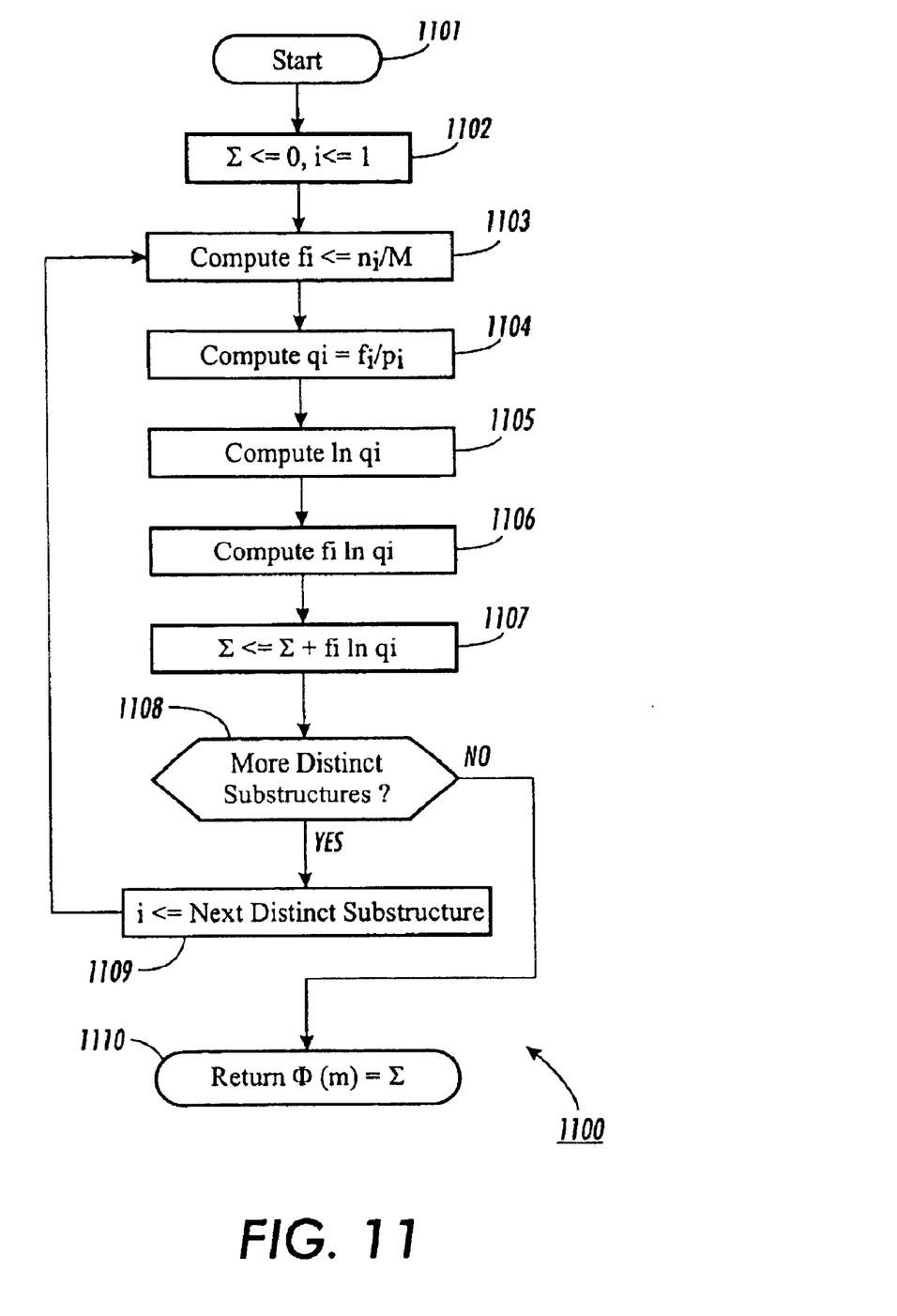
FIG. 11 is a flow chart illustrating yet another method for performing the step of computing the entropy using expected frequencies for distinct substructures and based upon n, through $n_M$ and M in the methods of the present invention.

FIG. 11 is a flow chart illustrating yet another method 1100 for performing the step of computing the entropy using expected frequencies for distinct substructures and based upon $n_1$ through $n_M$ and M in the methods of the present invention. The method 1100 is yet another alternative method for implementing the step 204 shown in FIG. 2, and is described by Equation 4 above. The method 1100 begins at step 1101. At step 1102, the sum Σ is initialized to zero, and the substructure counter i is initialized to one. At step 1103, the frequency $f_i$ of all substructures that are similar to distinct substructure $c_i$ (including $c_i$ itself) is computed by dividing the similarity count number $n_i$ by M. A quotient $q_i$ is computed at step 1104 by dividing the frequency $f_i$ by an expected frequency pi. The logarithm of the quotient $q_i$ is computed at step 1105. At step 1106, the frequency $f_i$ is multiplied by the logarithm of quotient $q_i$. At step 1107, the sum Σ is accumulated by adding the result of step 1106 to the current value of the sum Σ. Test 1108 determines if more distinct substructures exist which have not yet been included in the computation. If so, step 1109 increases the substructure counter i to the next distinct substructure, and returns the method to step 1103. If not, step 1110 returns the sum Σ as the entropy Φ(m).

The easily-computed measure of diversity for combinatorial structures according to the present invention is applicable to a variety of Web-based applications. Some possibilities include:

1. Automated search methods that require an initial "random" set of web pages from which to start searching. These search methods benefit from checking the diversity of this set using the measure according to the present invention. In particular, it is helpful to avoid low diversity starting sets which might tend to focus the search on a limited range of topics.

2. A search specifically looks for different points of view on a topic, or communities of different individuals involved in different aspects. Using the diversity measure according to the present invention helps to identify the broadest possible sampling of distinct views from a relatively small set of returned items.

3. Agent-based transactions on the Web, including electronic commerce, benefit from comparing a diverse set of options as measured by the diversity measure according to the present invention before selecting the best transaction to proceed with or recommend to a user. The rate at which diversity changes over time as additional Web pages are sampled suggests when it is reasonable to stop searching. This is an example of the more general ecological tradeoff between exploring for new possibilities and exploiting those already found.

4. The diversity measure according to the present invention, especially using relative entropy as described in Equation 4 helps to discriminate among different sets of Web pages. For example, this determines whether additional search terms or refinements make significant differences in the variety of pages returned from the search. Reducing the diversity corresponds to a more tightly focused result while larger diversity gives a broader variety of results.

Beyond these applications, the relation of diversity to complexity and adaptability in ecological contexts identifies parts of the Web that are most adaptable or unstable with respect to changes in the environment (for example, new software techniques or user tasks that spread around the Web). Because models of ecosystems and communication patterns in organizations can exhibit sudden instabilities as their size, connectivity or variation in use increases, identifying particularly diverse areas of the web provides early observations of any new instabilities or large-scale changes.

More speculatively, designed diversity of aggregate properties of the links helps to modify the rate of such changes or their ultimate result. Thus examining whether and how diversity is related to adaptability suggests how often to re-index Web pages based on their likely rates of changes.

Beyond Web based applications, this new diversity measure according to the present invention also applies to more general search problems. For instance, maintaining diversity is an important problem in genetic algorithms that could benefit from a measure of diversity not just in the number of different individuals in a population but also the structure inherent in their overlapping behaviors or capabilities. Another example is using diversity to determine the extent to which a new search problem is likely to be a typical instance of various previously studied classes of combinatorial searches. Because of the observed regularities in many classes of search problems (4), such a measure could help determining whether the new problem is likely to be particularly hard before attempting the search.

While the general diversity measure according to the present invention is helpful, there are also a number of limitations. First, for particular applications, one still needs to identify the relevant substructures and an appropriate notions of identity for them (or, alternatively, a metric and associated threshold). These substructures, in turn, must be feasible to compute. Second, for empirically observed classes of combinatorial objects there is no analytical expression for the maximum possible diversity for structures within that class (for example, due to various, possibly unknown, constraints on the types of structures that appear). In such cases it is difficult to know whether a particular value of diversity is near the maximum possible value of diversity. Third, some important aspects of diversity are in the dynamical evolution of the structures (for example, the history of changes to a Web page) rather than its static form at any particular time. These aspects are not included in the measure based on the structure of combinatorial objects. Finally, much of the interesting "higher level" content of the Web does not appear in purely "syntactic" structures such as the graph of relations among pages. This issue applies generally to automated information extraction, but with large collections, statistical techniques that do not explicitly evaluate content are nevertheless quite successful. This observation suggests that simple measures of structure, including the diversity measure introduced here, are usefully applied to collections of Web pages.

Although the present invention has been described with respect to its preferred and alternative embodiment, those embodiments are offered by way of example, not by way of limitation. It is to be understood that various additions and modifications can be made without departing from the spirit and scope of the present invention. Accordingly, all such additions and modifications are deemed to lie with the spirit and scope of the present invention as set out in the appended claims.

What is claimed is:

1. A method for computing a diversity measure for a group of web pages, C, having n elements, wherein the diversity measure indicates a level of diversity for the group of web pages, the method comprising steps of:
   (a) identifying M substructures $c_1$ through $c_M$ each having m elements from among the n elements of the group of web pages C, where M equals $n!/[(n-m)!m!]$;
   (b) for each substructure $c_i$, for i from 1 to M, determining a number $n_i$ of the M substructures $c_1$ through $c_M$ that are similar to the substructure $c_i$; and
   (c) computing a first entropy $\Phi(m)$ based upon all the numbers $n_i$ and M computed during step (d) and based upon M in computed step (a).

2. A method as in claim 1, further comprising the steps of:
   (d) repeating steps (a) and (b) with m+1 substituted for m;
   (e) computing a second entropy $\phi(m+1)$ based upon all the numbers $n_i$ and M computed during step (d); and
   (f) subtracting the second entropy $\phi(m+1)$ from the first entropy $\phi(m)$ to produce the diversity measure.

3. A method as in claim 2, wherein steps (c) and (e) comprise the steps of:
   for each i from 1 to M:
   computing a fraction $F_i$ by dividing $n_i$ by M; and
   computing a logarithm of fraction $F_i$;
   computing a sum by adding all logarithms of fractions $F_i$ for i from 1 to M; ad dividing the sum by M.

4. A method as in claim 2, wherein step (b) comprises the steps of, for each substructure $c_i$ for i from 1 to M:
   for each substructure $c_j$ for j from 1 to M:
   computing a distance function $d(c_i,c_j)$ representing a measure of a difference between substructure $c_i$ and substructure $c_j$;
   comparing the distance function $d(c_i,c_j)$ to a threshold; and
   determining the substructures $c_i$ and $c_j$ to be similar if and only if the distance function $d(c_i,c_j)$ is less than the threshold.

5. A method as in claim 2, wherein steps (c) and (e) comprise the steps of:
   for each distinct substructure $c_i$;
   computing a frequency $f_i$ by dividing $n_i$ by M;
   computing a logarithm of frequency $f_i$; and
   computing a product by multiplying the frequency $f_i$ and the logarithm of frequency $f_i$; and
   computing a sum by adding all products of the frequencies $f_i$ and the logarithms of frequencies $f_i$.

6. A method as in claim 2, wherein step (b) comprises the steps of:
   for each substructure $c_i$ for i from 1 to M:
   monotonically renumbering m elements of $c_i$ from 1 to m; and
   for each substructure $c_j$ for j from 1 to M:
   monotonically renumbering m elements of $c_j$ from 1 to m; and
   determining the substructures $c_i$ and $c_j$ to be similar if and only if they are identical.

7. A method as in claim 2, wherein step (b) comprises the steps of:
   for each substructure $c_i$ for i from 1 to M:
   monotonically renumbering m elements of $c_i$ from 1 to m; and
   for each substructure $c_j$ for j from 1 to M:
   monotonically renumbering m elements of $c_j$ from 1 to m; and
   determining the substructures $c_i$ and $c_j$ to be similar if and only if they are identical or isomorphic.

8. A method as in claim 2, wherein steps (c) and (c) comprise the steps of:
   for each distinct substructure $c_i$:
   computing a frequency $f_i$ by dividing $n_i$ by M;
   computing a quotient by dividing the frequency $f_i$ by an expected frequency $p_i$;
   computing a logarithm of quotient $q_i$; and
   computing a product by multiplying the frequency $f_i$ and the logarithm of quotient $q_i$; and
   computing a sum by adding all products of the frequencies $f_i$ and the logarithms of quotients $q_i$.

9. A computer readable storage medium, comprising:
   computer readable program code embodied on said computer readable storage medium, said computer readable program code for programming a computer to perform a method for computing a diversity measure for a group of web pages, C, having n elements, wherein the diversity measure indicates a level of diversity for the group of web pages, the method comprising steps of:
   (a) identifying M substructures $c_1$ through $c_M$ each having m elements from among the n elements of the group of web pages C, where M equals $n!/[(n-m)!m!]$;
   (b) for each substructure $c_i$, for i from 1 to M, determining a number $n_i$ of the M substructures $c_1$ through $c_M$ that are similar to the substructure $c_i$; and (c) computing a first entropy $\Phi(m)$ based upon all the numbers $n_i$ computed during step (b) and based upon M in computed step (a).

10. A computer readable storage medium as in claim 9, the method further comprising the steps of:
   (d) repeating steps (a) and (b) with m+1 substituted for m;
   (e) computing a second entropy $\Phi(m+1)$ based upon all the numbers $n_i$ and M computed during step (d); and
   subtracting the second entropy $\Phi(m+1)$ from the fist entropy $\Phi(m)$ to produce the diversity measure.

11. A computer readable storage medium as in claim 10, wherein steps (c) and (e) comprise the steps of:
   for each i from 1 to M:
      computing a fraction $P_i$ by dividing $n_j$ by M; and
      computing a logarithm of fraction $F_i$;
   computing a sum by adding all logarithms of fractions $F_i$ for i from 1 to M; and
   dividing the sum by M.

12. A computer readable storage medium as in claim 10, wherein step (b) comprises the steps of, for each substructure $c_i$ for i from 1 to M:
   for each substructure $c_j$ for j from 1 to M:
      computing a distance function $d(c_i,c_j)$ representing a measure of a difference between substructure $c_i$ and substructure $c_j$;
      comparing the distance function $d(c_i,c_j)$ to a threshold; and
      determining the substructures $c_i$ and $c_j$ to be similar if and only if the distance function $d(c_i,c_j)$ is less than the threshold.

13. A computer readable storage medium as in claim 10, wherein steps (c) and (e) comprise the steps of:
   for each distinct substructure $c_i$:
      computing a frequency $f_i$ by dividing $n_i$ by M;
      computing a logarithm of frequency $f_i$; and
      computing a product by multiplying the frequency $f_i$ and the logarithm of frequency $f_i$; and
   computing a sum by adding all products of the frequencies $f_i$ and the logarithms of frequencies $f_j$.

14. A computer readable storage medium as in claim 10, wherein step (b) comprises the steps of:
for each substructure $c_i$ for i from 1 to M:
   monotonically renumbering m elements of $c_i$ from 1 to m; and
   for each substructure $c_j$ for j from 1 to M:
      monotonically renumbering m elements of $c_j$ from 1 to m; and
      determining the substructures $c_i$ and $c_j$ to be similar if and only if they are identical.

15. A computer readable storage medium as in claim 10, wherein step (b) comprises the steps of:
for each substructure $c_i$ for i from 1 to M:
   monotonically renumbering m elements of $c_i$ from 1 to m; and
   for each substructure $c_j$ for j from 1 to M:
      monotonically renumbering m elements of $c_j$ from 1 to m; and
      determining the substructures $c_i$ and $c_j$ to be similar if and only if they are identical or isomorphic.

16. A computer readable storage medium as in claim 10, wherein steps (c) and (e) comprise the steps of:
   for each distinct substructure $c_i$:
      computing a frequency $f_i$ by dividing $n_i$ by M;
      computing a quotient by dividing the frequency $f_i$ by an expected frequency $p_i$;
      computing a logarithm of quotient $q_i$; and
      computing a product by multiplying the frequency $f_i$ and the logarithm of quotient $q_i$; and
   computing a sum by adding all products of the frequencies $f_i$ and the logarithms of quotients $q_i$.

17. A computer system, comprising:
   a processor; and
   a processor readable storage medium coupled to the processor having processor readable program code embodied on said processor readable storage medium, said processor readable program code for programming the computer system to perform a method for computing a diversity measure for a group of web pages, C, having n elements, wherein the diversity measure indicates a level of diversity for the group of web pages, the method comprising steps of:
   (a) identifying M substructures $c_1$, through $c_M$ each having m elements from among the n elements of the group of web pages C, where M equals $n!/[(n-m)!m!]$;
   (b) for each substructure $c_i$, for i from 1 to M, determining a number $n_i$ of the M substructures $c_1$ through $c_M$ that are similar to the substructure $c_i$; and
   (c) computing a first entropy $\Phi(m)$ based upon all the numbers $n_i$ computed during step (b) and based upon M in computed step (a).

18. A computer system as in claim 17, the method further comprising the steps of:
   (d) repeating steps (a) and (b) with m+1 substituted for m;
   (e) computing a second entropy $\Phi(m+1)$ based upon all the numbers $n_i$ and M computed during step (d); and
   (f) subtracting the second entropy $\Phi(m+1)$ from the first entropy $\Phi(m)$ to produce the diversity measure.

19. A computer system as in claim 18, wherein steps (c) and (e) comprise the steps of:
   for each i from 1 to M:
      computing a fraction $F_i$ by dividing $n_i$ by M; and
      computing a logarithm of fraction $F_i$;
   computing a sum by adding all logarithms of fractions $F_i$ for i from 1 to M; and
   dividing the stun by M.

20. A computer system as in claim 18, wherein step (b) comprises the steps of, for each substructure $c_i$ for i from 1 to M:
   for each substructure $C_j$ for j from 1 to M:
      computing a distance function $d(c_i,c_j)$ representing a measure of a difference between substructure $c_i$ and substructure $c_j$;
      comparing the distance function $d(c_i,c_j)$ to a threshold; and
      determining the substructures $c_i$ and $c_j$ to be similar if and only if the distance function $d(c_i,c_j)$ is less than the threshold.

21. A computer system as in claim 18, wherein steps (c) and (e) comprise the steps of:
   for each distinct substructure $c_i$:
      computing a frequency $f_i$ by dividing $n_i$ by M;
      computing a logarithm of frequency $f_i$; and
      computing a product by multiplying the frequency $f_i$ and the logarithm of frequency $f_i$; and
   computing a sum by adding all products of the frequencies $f_i$ and the logarithms of frequencies $f_i$.

22. A computer system as in claim 18, wherein step (b) comprises the steps of:
for each substructure $c_i$ for i from 1 to M:
   monotonically renumbering m elements of $c_i$ from 1 to m; and for each substructure $c_j$ for j from 1 to M:
    monotonically renumbering m elements of $c_j$ from 1 to m; and
    determining the substructures $c_i$ and $c_j$ to be similar if and only if they are identical.

23. A computer system as in claim 18, wherein step (b) comprises the steps of:

for each substructure $c_i$ for i from 1 to M:
    monotonically renumbering m elements of $c_j$ from 1 to m; and for each substructure $c_j$ for j from 1 to M:
    monotonically renumbering m elements of $c_j$ from 1 to m; and
    determining the substructures $c_i$ and $c_j$ to be similar if and only if they are identical or isomorphic.

24. A computer system as in claim 18, wherein steps (c) and (e) comprise the steps of:

for each distinct substructure $c_i$:
    computing a frequency $f_i$ by dividing $n_i$ by M;
    computing a quotient by dividing the frequency $f_i$ by an expected frequency $p_i$;
    computing a logarithm of quotient $q_i$; and
    computing a product by multiplying the frequency $f_i$ and the logarithm of quotient $q_i$; and computing a sum by adding all products of the frequencies $f_i$ and the logarithms of quotients $q_i$.

\* \* \* \* \*